US005850250A

United States Patent [19]
Konopka et al.

[11] Patent Number: 5,850,250
[45] Date of Patent: Dec. 15, 1998

[54] VIDEO DISTANCE LEARNING SYSTEM

[75] Inventors: Miles A. Konopka, Forest Hill; John A. Powers, III, Belair; Ray McNew, Baltimore; Angelo T. Meola, Monkton, all of Md.

[73] Assignee: Bell Atlantic Maryland, Inc., Cockeysville, Md.

[21] Appl. No.: 276,472

[22] Filed: Jul. 18, 1994

[51] Int. Cl.[6] ........................................... H04N 7/15
[52] U.S. Cl. .................................. 348/15; 348/61
[58] Field of Search ........................ 358/86, 108, 93; 348/6, 8, 7, 9, 12, 13, 14, 15, 16, 61; 455/3.1, 4.2, 5.1, 5.3; 434/322, 323, 324, 365, 379, 432, 307 R

[56] References Cited

U.S. PATENT DOCUMENTS

| | | |
|---|---|---|
| 3,401,469 | 9/1968 | Shaver et al. . |
| 3,606,688 | 9/1971 | Zawels et al. . |
| 4,054,908 | 10/1977 | Poirier et al. . |
| 4,264,928 | 4/1981 | Schober . |
| 4,367,485 | 1/1983 | Hemmie ........................ 348/12 |
| 4,400,724 | 8/1983 | Fields . |
| 4,430,526 | 2/1984 | Brown et al. . |
| 4,650,929 | 3/1987 | Boerger et al. . |
| 4,686,698 | 8/1987 | Tompkins et al. . |
| 4,785,472 | 11/1988 | Shapiro . |
| 4,961,211 | 10/1990 | Tsugane et al. . |
| 4,980,761 | 12/1990 | Natori . |
| 5,206,721 | 4/1993 | Ashida et al. . |
| 5,315,633 | 5/1994 | Champa ........................ 348/15 |

FOREIGN PATENT DOCUMENTS

| | | | |
|---|---|---|---|
| 0058443 | 2/1990 | Japan ........................ 348/15 |
| 0237387 | 9/1990 | Japan ........................ H04N 7/15 |

OTHER PUBLICATIONS

"The Design of Picturephone Meeting Service (PMS) Conference Centers for Video Teleconferencing," by Bernard A. Wright, *IEEE Communications Magazine*, Mar. 1988.

Moriyama, Atsuo "RF–Type Two–way School Broadcasting Systems Has Wide Field of Applications" IEE vol. 17, #166 Oct. 1980 pp. 44–47.

Pettit et al. "The Stanford Instructional Television Network" IEEE Spectrum May 1970 pp. 73–80.

Kikuchi et al., "New Video Conferencing System" Japan Telecommunications Review (Japan) vol. 22 No. 2 pp. 112–119 Apr. 1980.

*Primary Examiner*—David E. Harvey
*Attorney, Agent, or Firm*—Fulbright & Jaworski LLP

[57] ABSTRACT

A video distance learning system including a teaching classroom connected to remote learning classrooms by a fiber-optic communication network. The teaching classroom includes at least a rear audio/video cabinet housing four video monitors and a camera. The remote classrooms have front cabinets with four monitors and a camera. In a normal operating mode, one of the video monitors will display the teacher, while the other three monitors display classroom images. A rear video camera mounted is focused on the teacher and a front video camera may be focused on the students. The front video cabinet may have a graphics or document camera is also provided on the front video cabinet. The document camera points downward at a light table to image materials such as books, pictures and overhead transparencies. The teacher may switch between the rear camera, the front camera and the document camera. A teacher's work station, may be located at the front of the teaching classroom. A control panel allows the teacher to control all devices located within the room, such as volume, displays, or focus. The work station may also include a personal computer interfacing with the network to schedule classes. The video distance learning system facilitates eye contact between the teacher in a teaching classroom and students in remote classrooms.

43 Claims, 11 Drawing Sheets

VIDEO DISTANCE LEARNING SYSTEM

BACKGROUND OF THE INVENTION

The subject matter of this application is related to that set forth in U.S. patent application Ser. Nos. 29/021,123 and 29/021,182, the disclosures of which are incorporated herein.

1. Field of the Invention

The present invention relates to an audio/video communication network system. More particularly, the invention concerns a number of remote classrooms connected to one another through a fiber optic network communication system, each classroom supported by audio and video transmitting and receiving devices. The video distance learning system allows for point to multi-point, interactive instruction from a teacher in one location, the teaching classroom, to students in the same location and to students located in remote classrooms.

2. Description of the Related Technology

Since the inception of the public education system, classroom instruction of a group of students by a single teacher has proven to be an effective method of teaching. The classroom setting facilitates learning by providing direct face-to-face interactive communication between the teacher and students. A student in the classroom may ask a question and receive immediate feedback from the teacher, and a teacher may ask questions of the students and receive immediate responses from the students. The classroom setting is intended to ensure that the students are attentive and that they are comprehending the lessons being taught.

Due to limitations on classroom size and geographic considerations, it is often difficult to bring all students together in a classroom with a teacher. In such instances, it may be desirable to provide instruction to a number of students in adjacent or geographically remote classrooms who cannot attend the lecture in the teaching classroom. For example, students wishing to attend a lecture given by a teacher on a particular topic may be unable to travel to the particular site of the lecture. Under such circumstances, it may be desired to provide instruction to these students via a distance learning system.

In the past, a variety of methods involving televised or video taped lectures have been implemented for teaching students at sites remote from a teacher. However, no altogether satisfactory method has heretofore been available for teaching students located at sites remote from each other and from the teacher.

Shaver, et al., U.S. Pat. No. 3,401,469, describes an educational system for broadcasting information from a central source to a plurality of remote learning stations. One or more channels of audio and visual information signals are transmitted from a central control station to a plurality of learning stations located in a room remote from the control station. Each individual receiving station includes means for amplifying the information signals and for providing either audio or video reproduction thereof, and means for sending return signals back to the central station. The audio and visual information signals are transmitted through bundles of glass light fibers.

Zawels, et al., U.S. Pat. No. 3,606,688, describes a method and apparatus for teaching a multiplicity of students located remotely from a central teaching center. According to the method, information in a predetermined format is electromagnetically transmitted from the central teaching center to the remote location of each student. The predetermined information includes a question accompanied by at least one potential response to the question. The patent also discloses a device including a question and a potential response input means and a transmitter at the teaching center; input, output and logic means including comparator logic means and a receiver at each remote student location; and an electromagnetic energy transmitting medium between the teaching station and each remote student location.

Boerger, et al., U.S. Pat. No. 4,650,929, describes a communication system for video conferencing which enables participants to see each other continuously and simultaneously, and to show documents and objects, as necessary. A central station for video conferencing is provided which includes video control, audio control, identifying mark generators, picture storage and audio and video mixing. Each of the connected subscriber stations includes a video monitor, video cameras, speakers, microphones and means for individually controlling both the video and audio reception. The video monitor may display images from multiple other subscriber stations through various split screen combinations.

Thompkins, et al., U.S. Pat No. 4,686,698 describes a work station for interfacing with a video conference network including a display with an internal camera. The camera and various auxiliary devices, such as a VCR, are input to a video switch for selecting a video output. A video output is delivered to a monitor and/or to a network through an interface circuit. Additionally, video can be received from a local processor or the network. A microphone and a speaker are provided and controlled by an audio switch. This allows a full duplex audio and video communication between work stations.

Shapiro, U.S. Pat. No. 4,785,472, describes a remote teaching system including a teacher's station and a plurality of student stations which may be located at sites remote from one another. Each station includes a speaker telephone or other voice telephone set which is connectable to a telephone system for voice communication among the various stations. Each station also includes a video display monitor and a video media player connected to the video display monitor. Each student station also includes a video media player control alert connected to the video media player of the student station. The teacher station also includes a video media player master controller connected to the teacher station video media player. The video media player master controller located at the teacher station and the video media player controller located at the student stations are connected to the telephone system. Telephonic signals are transmitted and received over the telephone system, so that playing the teacher station video media player and the student station video media players can be synchronized. Ordinarily, a teacher would prepare a video taped lesson. Multiple copies of the video taped lesson would be prepared. One copy being is provided to each student station and for the teacher station. If a student has a question about a point in the lecture playing on the video tape cassette player, he or she can speak to the teacher over a voice telephone set at the remote site to ask the question.

The remote teaching system disclosed in Shapiro, U.S. Pat. No. 4,785,472 has a number of significant drawbacks. For example, the use of a prerecorded lecture significantly inhibits the interpersonal nature of a classroom type lecture. Furthermore, the remote teaching system does not provide a visual link between a teacher and a teaching station and students in remote locations.

Heretofore, prior art video conferencing workstations have been limited to systems including a single monitor and a single camera for providing face-to-face interactive communication between a single user at that work station and users at other work stations connected to the network. Furthermore, the prior art remote teaching systems have been limited to systems for broadcasting pre-recorded instructional media and/or have also been limited to a work station including a single monitor for providing face-to-face communication between a teacher and individual students located at individual remote locations.

For the foregoing reasons, there exists a need for a video distance learning system which creates a "transparent" or "virtual" classroom atmosphere by allowing the teacher to establish virtual eye contact with students in a plurality of remote classroom locations. A need exists for providing a plurality of remote classroom work stations connected by a full duplex audio/video network which allows teachers and students to see, hear, and interact with one another. There is also a need for a video distance learning system which transmits full motion video images. It is also desirable to provide a system wherein video and audio images from one location can be broadcast to all other remote locations connected to the communication network.

SUMMARY OF THE INVENTION

The present invention is directed to a video distance learning classroom system which facilitates virtual eye contact between a teacher in a teaching classroom and students in a one or more remote locations. In an alternative operating mode, audio and video information from a single location may be broadcast over a communications network for the video distance learning system to any number of remote locations.

The present invention allows for point-to-point, or point-to-multi-point interactive instruction from a teacher in one location, the teaching classroom, to students in the same location and to students located in remote classrooms. According to the preferred embodiment, during an instructional session a communications network connects a teaching classroom to three remote classrooms. Each classroom is supported by four video monitors located at the rear of the classroom, one of the monitors enables the teacher to see himself or herself, and the other monitors enable the teacher to see students in the three corresponding remote classrooms. A video cabinet having four monitors is located in the front of each classroom and allows students in each of the individual classrooms to see a video image of the teacher and three corresponding classrooms. A video camera located at the rear of the teaching classroom may be focused upon the teacher. Another camera may be located at the top of the video cabinet in the front of the classroom and may be focused upon the students in that particular classroom. It is possible to have more than three remote classrooms participate in the video distance learning system. The additional classrooms simply would not be displayed on any remote monitors. They would be able to listen and look in on the lesson. Provisions could be made to mix in the audio from the additional classrooms and time divide or select their image as a substitute for one of the "live" remote classrooms when appropriate.

The classrooms are connected to one another by a communications network, preferably utilizing fiber-optic cables. Video and audio signals are transmitted between the teaching classroom and the remote locations through the fiber-optic network. A CODEC machine located in each classroom converts the digital information from the fiberoptic network into video and audio signals which are then broadcast in the classrooms by monitors for displaying the video signal and distribution amplifiers and speakers for broadcasting the audio signals.

United States Pat. No. 5,247,347, the disclosure of which is incorporated herein, shows one type of communications network suitable for use in connection with the video distance learning system described herein.

A cabinet housing four video monitors is located at the rear of the teaching classroom. In a normal operating mode, one of the video monitors will display a video image of the teacher, while the other three monitors display video images of the three remote classrooms. A video camera is mounted at the top of the cabinet and is focused on the teacher in the front of the classroom. The monitors are mounted in the cabinet at a height so that they are readily visible to the teacher from the front of the classroom.

A cabinet housing four individual monitors is also located at the front of each remote classroom. One monitor in the front cabinet is dedicated to the teaching classroom, while other classrooms may be displayed on the remaining monitors. A camera may be mounted at the top of the cabinet and focused on the students in the classroom.

According to an alternative configuration, more than one "teaching image" could be displayed on the monitors. If the teacher is using a document camera or an auxiliary display device such as a computer or VCR, that image could be displayed on one monitor. A second monitor could display an image of the instructor, temporarily dropping the display of one of the remote classrooms.

Both the front and rear camera are completely enclosed and each mounted on a robotic pan, tilt and zoom system for controlling the aim of the camera. The camera may function automatically or through control by the teacher or a teacher's aide. The camera at the front of the classroom may be focused either on a wide view of the classroom or on an individual student who is speaking. According to one embodiment, the teacher or an aide may aim and focus the camera by a remote controller, either through a joy stick or other pointing controller or by preset locations. Accordingly to an alternative or optional feature, the camera controller may be voice-activated to focus on a particular person who is speaking. Upon activation of one of a series of microphones at preset locations within the classroom, the camera, either automatically or at the direction of the teacher's aide, aims at the location of the person speaking. Where the camera is automatically actuated by activation of a particular microphone, the microphone gates on when a certain level of volume is applied. The gating of the microphone activates robotics which focus the camera into the field of vision for the person speaking. The rear camera, which is focused on the teacher, may also be manually controlled to follow the teacher by a teacher's aide through a controller panel, a joy stick or other pointing controller or by preset locations. According to an alternative embodiment, the camera controller may be set to follow a "target" such as an infrared target worn by the teacher.

A graphics or document camera may also be provided on the front video cabinet. The document camera points downward at a light table for facilitating the display of materials such as books, pictures and overhead transparencies. The teacher is able to switch between the camera mounted at the rear of the classroom and the document camera or graphics camera to control the display of the monitor dedicated to the teaching classroom.

The audio system for each classroom may include a plurality of student microphones, a teacher's microphone, mixers, amplifiers, limiters, equalizers, a distribution amplifier and loud speakers. The video system in each classroom includes a plurality of cameras, video mixers, video distribution amplifiers, auxiliary video components and a plurality of monitors.

A teacher's work station may also be provided at the front of the teaching classroom. A control panel, such as a liquid crystal touch screen panel, allows the teacher to control all devices located within the classroom, such as audio volume, monitor displays, or camera focus. The system may include built-in thresholds which limit the range of control provided to the teacher. The controller is preferably hard wired into the system. Additionally, an infrared or radio frequency remote control may be utilized. The teacher's work station may also include a personal computer for interfacing with the network to schedule classes.

It is an object of the invention to provide a video distance learning system which facilitates direct eye-to-eye contact between a teacher in a teaching classroom and students in remote classrooms. It is a further object of the invention to provide a full motion video system defined by a full duplex video and audio transport network system which allows teachers and students to see, hear and interact with one another. A further object of the invention is to provide a system which allows for interactive participation in a classroom discussion by students located in remote classrooms, where a teacher in a teaching classroom is in direct audio and video contact with each remote classroom simultaneously.

The video distance learning system of the present invention facilitates eye contact between the teacher in a teaching classroom and students in one or more remote classrooms. During a discussion between the teacher in the teaching classroom and a student in a remote classroom, the teacher will be looking directly at the camera a monitor located in the rear of the room displaying a video image of the remote student classroom. The camera focused on the teacher is located in close proximity to that monitor. The student in the remote classroom will be looking directly at the monitor displaying a video image of the teacher in the teaching classroom. The camera focused on the student is located in close proximity to the instructor monitor. The close proximity of the receiving camera to the display monitor greatly facilitates increased sense of eye contact is possible between the teacher in the teaching classroom and a student in a remote classroom. This arrangement of "virtual" eye contact is possible because of the relationship between focal area of the eyes (monitor location) and the location of the camera. Thus, the student and the teacher will perceive a true rendering of a face to face conversation.

DESCRIPTION OF THE DRAWINGS

These and other features, aspects and advantages of the present invention will become better understood with regard to the following description, claims and accompanying drawings where:

DESCRIPTION OF THE INVENTION

Figure 1:
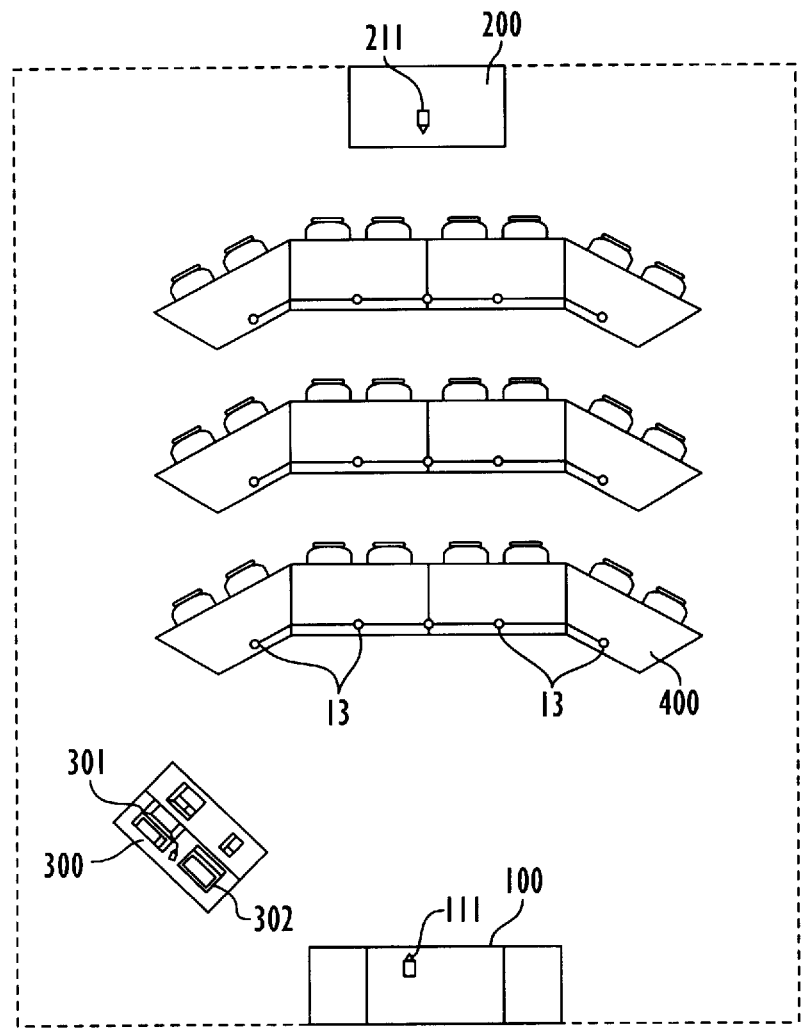
FIG. 1 shows an overhead plan view of a classroom embodying features of the present invention for video distance learning.

FIGS. 1 through 6 shows a preferred embodiment of a video distance learning classroom which may be connected to several other similarly configured classrooms through a communications network. As best seen in FIG. 1, each classroom of the video distance learning system includes a front audio/video cabinet 100 located at the front of the classroom, a rear audio/video cabinet 200 located at the rear of each classroom, a teacher's work station 300 located near the front of the classroom, and a plurality of student locations or desks 400 located in a central portion of the classroom. A plurality of microphones 13 are located at selected positions on the student desks 400.

Figure 2B:
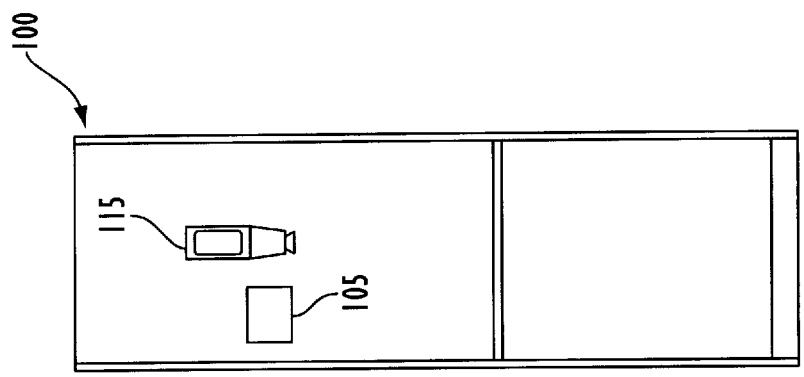
FIG. 2B is a right side view in elevation of the front audio/video cabinet shown in FIG. 2A.
Figure 2A:
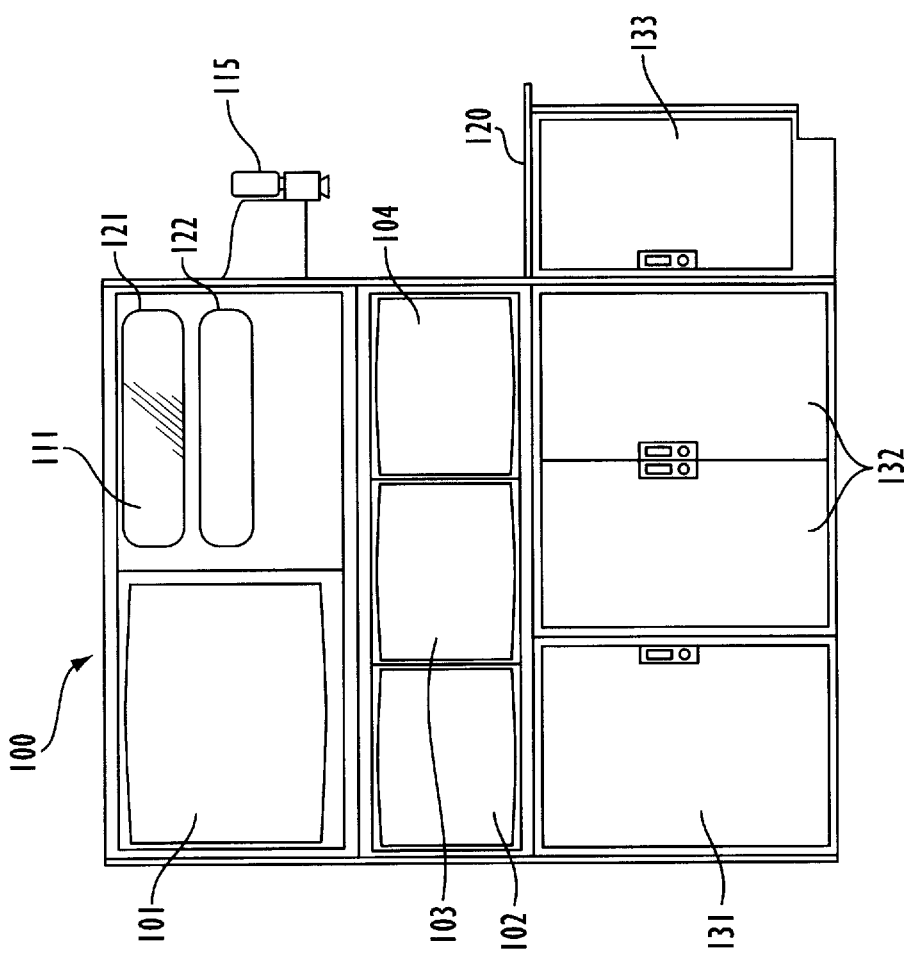
FIG. 2A is a front view in elevation of an embodiment of a front audio/video cabinet of the present invention for video distance learning.
Figure 4:
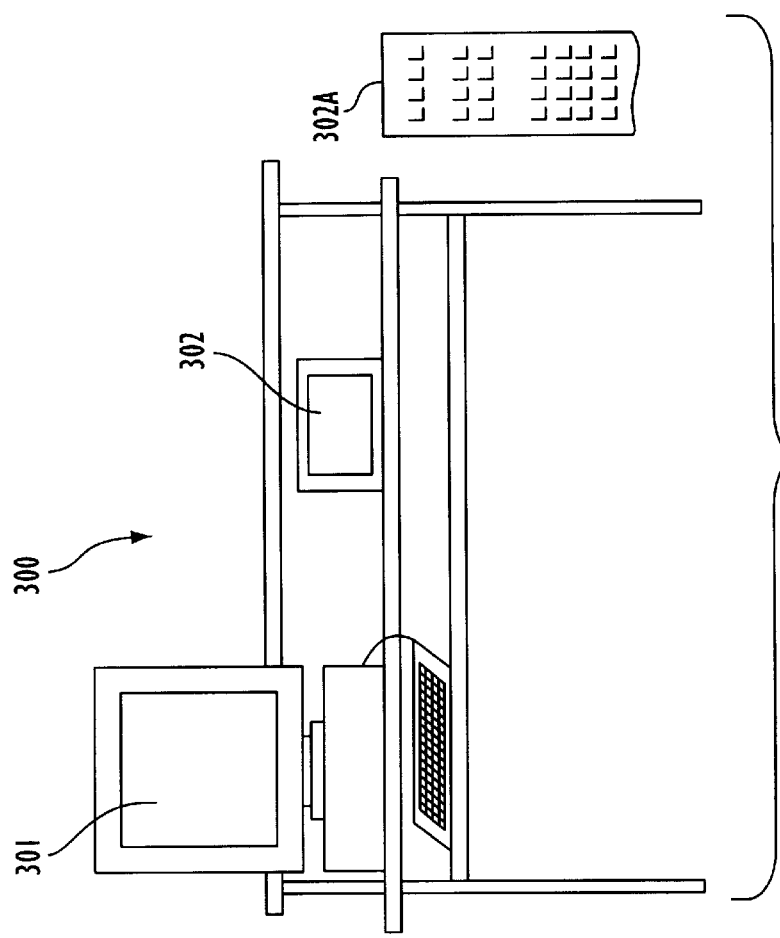
FIG. 4 shows a front view in elevation of an embodiment of a teacher's work station of the present invention for video distance learning.
Figure 3:
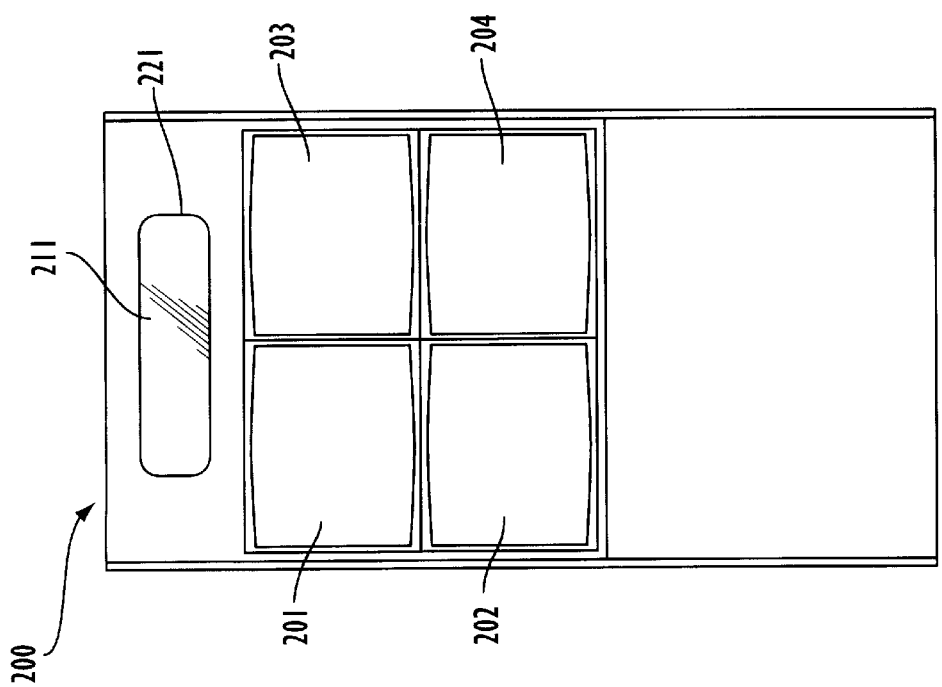
FIG. 3 is a front view in elevation of an embodiment of a rear audio/video cabinet of the present invention for video distance learning.

The front audio/video cabinet, as shown in FIG. 2A, includes a plurality of video monitors 101–104. According to a preferred embodiment, a first video monitor 101 is dedicated to the teaching classroom and in its preferred mode of operation displays either a video image of the teacher in the teaching classroom or instructional material selected by the teacher for display to students. The first video monitor 101 is preferably larger than the other video monitors 102–104. According to the preferred embodiment, the first video monitor is a 35" diagonal color monitor. It is also contemplated to provide a first monitor exhibiting dimensions smaller or larger than that of the preferred embodiment. The front audio/video cabinet 100 also includes secondary video monitors 102–104 for displaying video images of students situated in remote classrooms. According to the preferred embodiment, the front audio/video cabinet 100 includes three Video Monitors 102, 103, 104, each for displaying a video image of students in a remote classroom location. Although the preferred embodiment discloses a teaching classroom in direct audio and video communication with three remote classrooms, it is also contemplated to provide for communication between a teaching classroom and any number of remote classrooms by providing additional monitors in the front audio/video cabinet. According to the preferred embodiment, the monitors 102–104 for displaying images of the remote classrooms are 27" diagonal color monitors. It is also contemplated to provide monitors of larger or smaller dimensions than the preferred embodiment.

The front audio/video cabinet 100 also includes a preview monitor 105, preferably located in a side portion of the front audio/video cabinet. The preview monitor 105 allows a teacher to view an image of instructional materials received by document camera 115. This allows the teacher to better position the instructional materials for presentation to the class. According to the preferred embodiment, the preview monitor 105 includes a 9" diagonal color monitor. A preview monitor of larger or smaller dimensions is also contemplated as necessary.

A front video camera 111 is mounted within a top portion of the front audio/video cabinet 100 within the classroom for receiving a video image of students seated at student locations 400. The front camera 111 is completely enclosed and includes a robotic pan, tilt and zoom control system 113 which controls the direction in which the camera is aimed. The front camera 111 may be focused on either a wide view of the classroom or on an individual student. According to one embodiment, the teacher or a teacher's aide may control the aim and focus of the front camera 111 through a control panel 302 located at the teacher's workstation 300 or a handheld infrared remote controller 302A. According to an alternative or optional feature, the front camera controller 113 may be voice activated to focus in on a particular student who is speaking. Upon activation of one of the student microphones 13 at preset locations within the classroom, the front camera 111 either automatically, or through input from the control panel 302, aims at the microphone 13 into which the student is speaking. When the front camera 111 is actuated by activation of one of the microphones 13, the microphone gates on when a certain level of volume is applied. The gating of the microphone 13 activates the front camera control 113 which pans and focuses the camera into the field of vision for the person speaking.

The video distance learning classroom also includes a document camera 115 for receiving images of instructional materials placed on a document table 120. According to the preferred embodiment, the document camera 115 is advantageously mounted on a side of the front audio/video cabinet 100. The document table 120 is located directly beneath the document camera adjacent to the front audio/video cabinet 100. The document camera 115 includes a robotic control system 117 for focus and zoom control of the camera lens. The preview monitor 105 is hard-wired to the document camera 115 for displaying the received video image. According to one embodiment, an overhead light is provided for illuminating a document placed on the document table 120. According to an alternative embodiment, the document table includes a backlight for illuminating transparencies. According to the preferred embodiment, the video image received by the document camera 115 may be selectively displayed on the first video monitor 101 located in the front audio/video cabinet 100. The video image received by the document camera 115 may also be transmitted to the remote classroom locations through the communications network for display on the first video monitor 101 in each individual remote classroom. The teacher is able to switch between a rear camera 211 focused on the teacher and the document camera 115 to control the display of the first video monitor 101 dedicated to the teaching classroom.

A transparent panel 121 is provided in the front audio/video cabinet 100 for enclosing and protecting the front camera 111. A mesh speaker grill 122 is also provided for shielding and protecting the audio loudspeakers 39.

The lower portion of the front audio/video cabinet 100 includes cabinets 131, 132, 133 for housing operating equipment. Advantageously a network cabinet 131 is provided for housing network interface equipment such as a CODEC machine 45; a CPE cabinet 132 is provided for housing customer provided equipment; and an equipment cabinet 133 is provided for housing equipment such as a VCR and cassette recorder. According to one embodiment, the equipment contained in each of these cabinets 131–132 is mounted on slidable rails which allow the equipment to be pulled out from the cabinet for servicing or adjustment. Alternatively the equipment may be mounted on equipment racks.

The video distance learning classroom also includes a rear audio/video cabinet 200 located at a rear portion of the classroom. The rear audio/video cabinet 200 includes a plurality of video monitors 201–204 for displaying received video images. In the preferred mode of operation, a first rear video monitor 201 is dedicated to the teaching classroom for displaying an image of the teacher as received by the rear camera 211 or a video image of a document as received by the document camera 115. The remaining secondary rear video monitors 202–204 are preferably configured to display video images received by a front camera 111 located in each remote classroom. According to the preferred embodiment, the rear audio/video cabinet 200 includes four 27" diagonal color monitors. Larger or smaller monitors and more or less than four monitors for displaying video images from more than three remote classroom locations may be provided where appropriate. A rear camera 211 is located within a top portion of the rear audio/video cabinet 200 for receiving a video image of a teacher located at the front of the classroom. Like the front camera 111, the rear camera 211 is completely enclosed and includes a robotic pan, tilt and zoom control system 213. A rear camera power supply 233, which is controlled by the CPU 51, provides power to the rear camera control system 233. The rear camera control system 213 functions similar to the front camera pan, tilt and zoom control system 113. The rear camera 211 may include an R/F receiver 215 connected to the camera control 213. An R/F signal may be transmitted from a handheld controller 302A and received by the R/F receiver 215 for transmitting control signals to the rear camera control system 213. The control signals may be infrared signals or radio frequency signals. A transparent screen 221 is also provided in the rear audio/video cabinet 200 for enclosing and protecting the rear video camera 211.

The video distance learning classroom may also include a teacher's workstation 300 located near the front of the classroom. A personal computer 301 is provided at the teacher's workstation 300 for interfacing with the network to schedule available classroom sessions. The personal computer 301 may also be used for standard PC functions and can be linked to the network and audio/video components in the classroom for presentations. The teacher's workstation 300 also includes a control panel 302. According to the preferred embodiment, the control panel 302 is hard-wired to a CPU module 51 for controlling audio/video functions. The control panel 302 according to a preferred configuration exhibits a liquid-crystal display touch screen control panel. The LCD touch screen panel may display icons representing various audio/video control elements. The teacher's workstation may additionally include auxiliary devices such as facsimile machines, telephones and other devices which would enhance the teacher's ability to communicate with the remote classrooms.

Figure 5A:
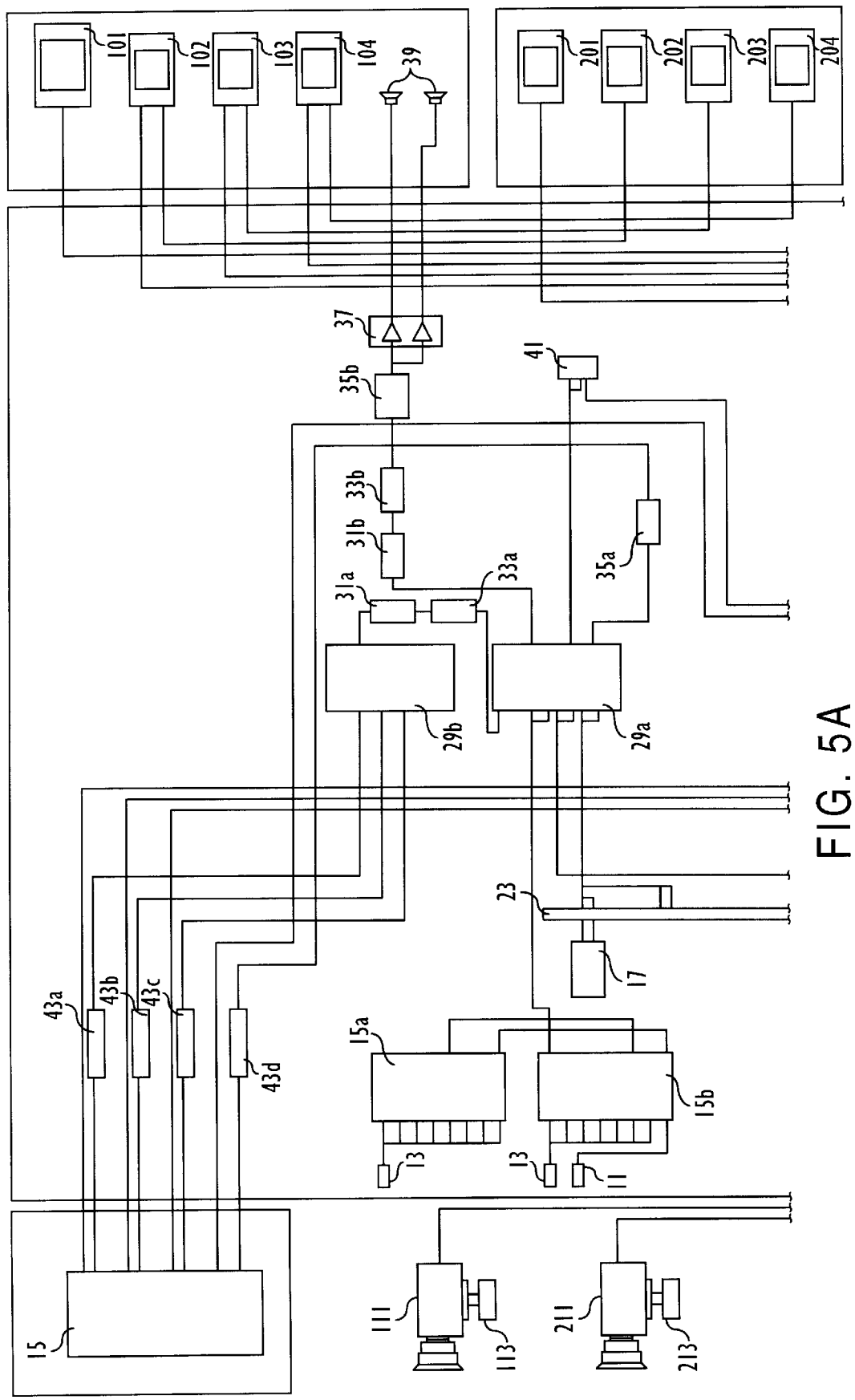
FIGS. 5A and 5B show a block audio/video functional diagram.
Figure 5B:
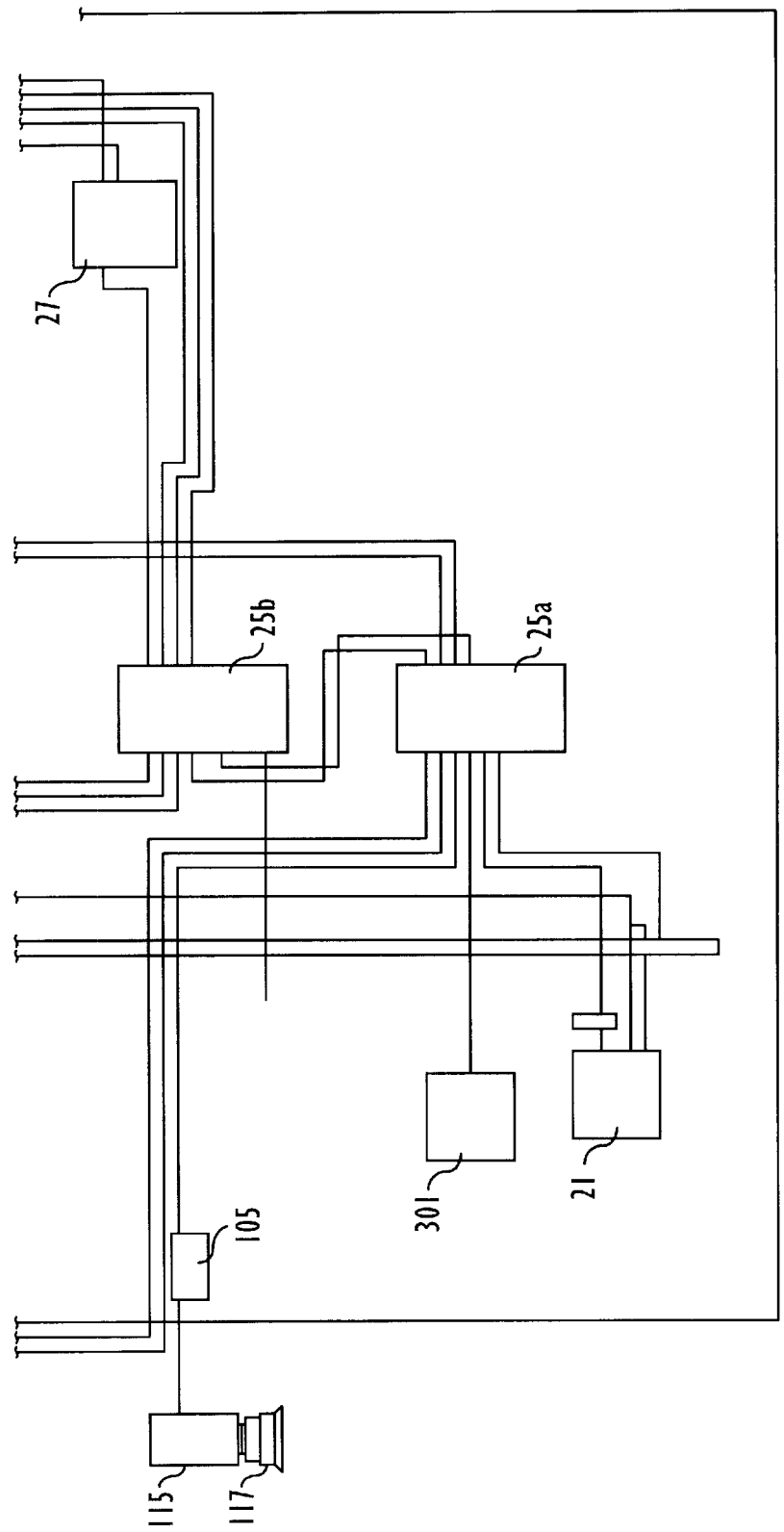

FIG. 5 shows a video distance learning classroom including a plurality of cameras and auxiliary devices for receiving video images; a plurality of microphones and auxiliary devices for receiving audio signals; audio and video mixers for selectively outputting audio and video signals to the output devices located in the room and to the network; audio and video amplifiers and enhancers for refining the audio and video signals to be output; and monitors and speakers.

The video system of the classroom includes a front video camera 111, a document camera 115 and a rear video camera 211. Each camera is hard-wired to a first video matrix or switcher 25a. Additional auxiliary devices such as a VCR 21 and PC 301 are also hard-wired to the first video matrix 25a either directly, or through an auxiliary input 23. According to the preferred embodiment, the first video matrix 25a includes eight inputs for receiving video from cameras 111, 115 and 211, and auxiliary devices, such as VCR 21 and PC 301. The first video switches 25A also includes four outputs for outputting selected video signals. According the preferred embodiment, a video signal from the first video matrix 25a is output to a CODEC machine 45 for transmission to the network. A second output from the first video matrix 25a is output to a record out panel 41. The remaining two outputs from video matrix 25a are output to an input of a second video switcher 25b. The second video matrix 25b also receives input from the CODEC machine 45 corresponding to each remote classroom. The preferred embodiment of the second video switcher 25B also includes four outputs. A first output of the second video mixer 25B is connected to a looped input of a video distribution amplifier 27. One output of the video distribution amplifier 27 is connected to an input of the first front video monitor 101 dedicated to the teaching classroom. A second output of the video distribution amplifier 27 is connected to an input of the first rear video monitor 201 dedicated to the teaching classroom. The remaining three outputs of the second video matrix switcher 25b are connected to inputs of the secondary front video monitors 102, 103 and 104, respectively. A looped output from each of the secondary front video monitors 102, 103 and 104 is connected to an input of a corresponding secondary rear monitor 202, 203 and 204, respectively, for displaying video images received from the remote classroom locations.

The audio system of the video distance classroom includes a first plurality of student microphones 13 connected to an input of a first microphone mixer 15a, and a second plurality of student microphones 13 and a teacher's microphone 11 connected to inputs of a second microphone mixer 15b. The first microphone mixer 15a and the second microphone mixer 15b are linked together and a single output from the combined microphone mixers is connected to a first line/mic mixer 29a. The first and second microphone mixers 15a and 15b are configured such that only a single audio signal received from the teacher microphone 11 and student microphones 13 is output to the first line/mic mixer 29a. The first line/mic mixer also includes additional inputs for auxiliary audio devices, such as cassette recorder 17 and VCR 21 through an auxiliary input 23. The first line/mic mixer 29a also includes an input from the network for receiving a single audio signal from one of the remote classroom locations. The CODEC machine 45 receives network audio signals from the remote classroom locations. Each audio signal is decoded and transmitted from the CODEC machine 45 to a respective relay 43a, 43b or 43c which transmits the audio signals to a second line/mic mixer 29b. The second line/mic mixer 29b receives audio input signals from the remote classroom locations and outputs a single audio signal to the first line/mic mixer 29a. The audio signal output from the second line/mic mixer 29b is enhanced by a volume control 31a and equalizer 33a prior to input into the first line/mic mixer 29a. The first line/mic mixer 29a includes a plurality of outputs. A first output is connected to the record-out panel 41. A second output is connected to the CODEC machine 45 through a limiter/compressor 35a and relay 43d. The CODEC machine 45 codes the signal for output to the network for transmission to the remote classroom locations. A third output of the first line/mic mixer 29a is configured to output an audio signal to the classroom through a plurality of loudspeakers 39. The audio signal output to the classroom is enhanced through volume control 31b, equalizer 33b, limiter/compressor 35b and amplifier 37.

Many of the components in this embodiment may be implemented by commercially available equipment as follows:

| | | |
|---|---|---|
| TEACHER'S MICROPHONE | SHURE | AMS28 |
| STUDENT MICROPHONE | SHURE | AMS22 |
| AMS MICROPHONE MIXER | SHURE | AMS8000 |
| 8 INPUT LINE LEVEL MIXER | RANE | SM82 |
| LINE/MIC MIXER | SHURE | M267 |
| AUTOMATIC GAIN CONTROL | SYMETRIX | 421 |
| LIMITER/COMPRESSOR | SYMETRIX | 501 |
| EQUALIZER | RANE | ME15 |
| POWER AMPLIFIER | STEWARD | PA1OO |
| CAMERA | IKEGAMI | |
| ZOOM LENS | CHUGAI | H10Z0812MP |
| 27' COLOR MONITOR | SELEKO | |
| VIDEO DISTRIBUTION AMPLIFIER | VIDEOTEK | VDA16/DAT1/DA |
| W/RACK ASSEMBLY | | |
| INTEGRATED CONTROL SYSTEM | CRESTRON | CRESTNET II MS |
| HANDHELD REMOTE CONTROL | CRESTRON | CNIRHT-30 |
| 8' TOUCH PANEL (DST) | CRESTRON | CTP1500 |
| VIDEO SWITCHER | CRESTRON | VIDMUX |
| PAN/TILT HEADS | VIACOM | |

Figure 6A:
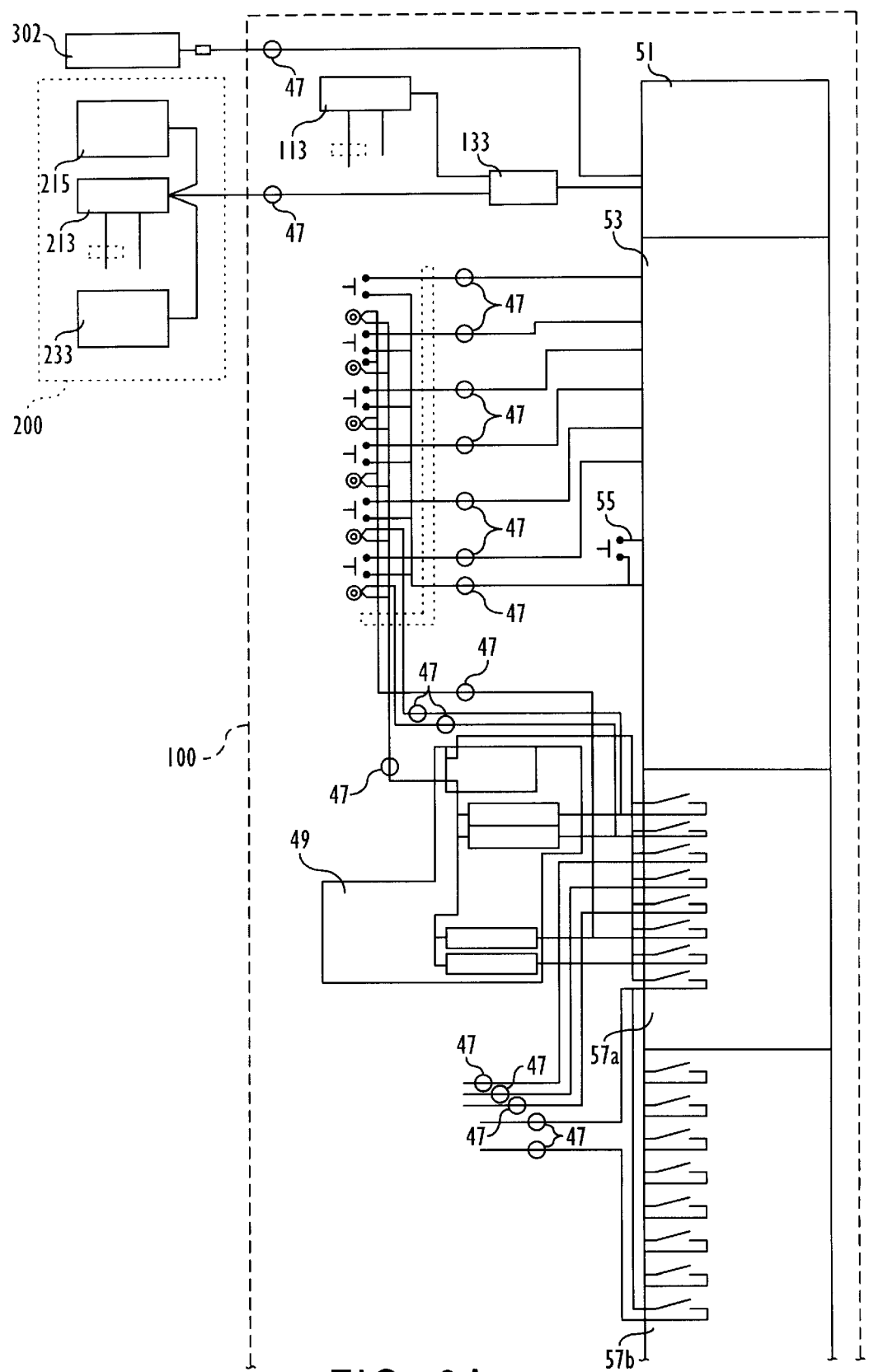
FIGS. 6A and 6B shows a block functional control diagram.
Figure 6B:
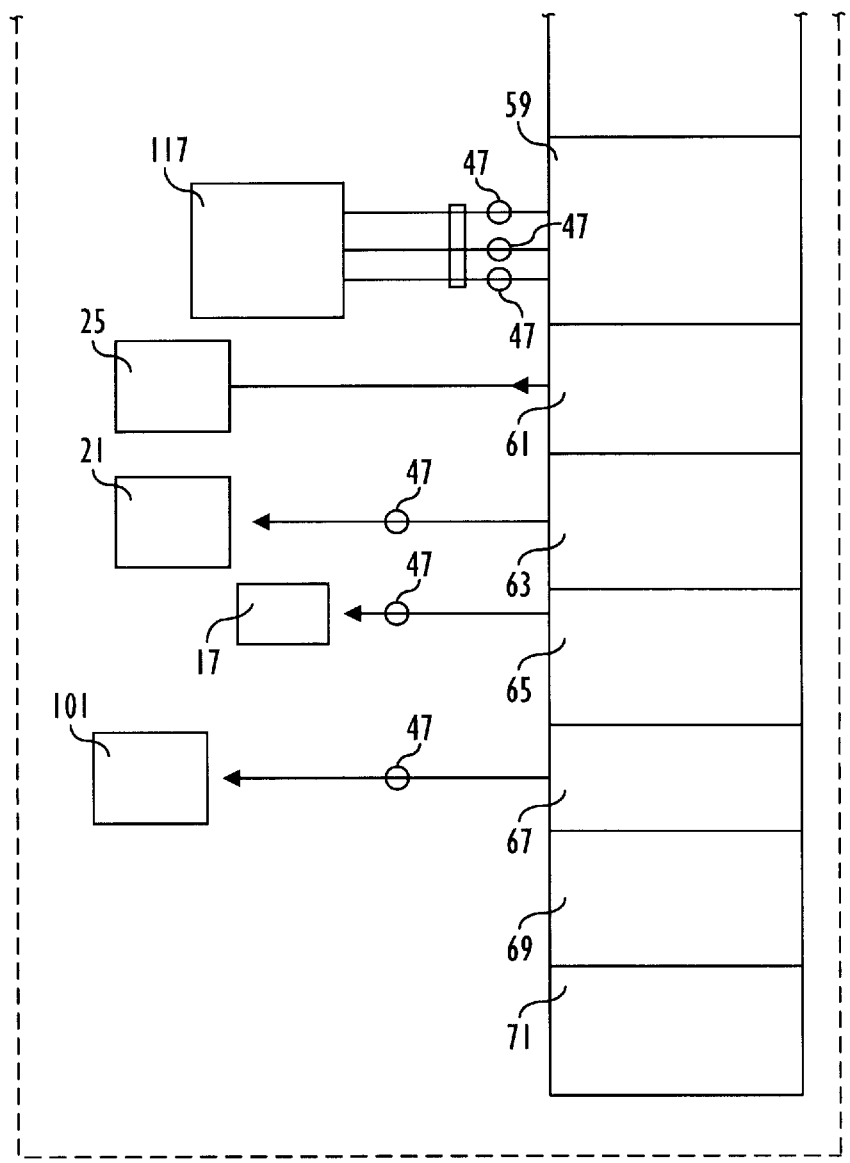

Referring to FIG. 6, the audio and video components of the classroom are controlled by a CPU module 51. A digital input/output slot 53 is connected to the CPU module 51 for controlling power output to the document camera focus and zoom controls and the upper and lower document table lights. A system power switch 55 is also provided for controlling the output of power to the entire classroom workstation. A second slot 57a and a third slot 57b each contain a plurality of switches which may be actuated to supply power from power supply 49 to the various output sources. The CPU module 51 also controls the document lens control through an R/F module 59. A plurality of infrared modules 61, 63, 65 and 67 are provided for controlling power output to various audio/video output devices under the control of the CPU module 51. The input and playback volume are controlled through modules 69 and 71 respectively. Terminal blocks 47 separate each individual component from its power supply source.

FIGS. 7–10 show a network architecture for connecting a plurality of distance learning classrooms according to a preferred embodiment. According to the preferred embodiment, the classrooms of the video distance learning system are connected by a broadband (45 Mbt) digital network which allows for full motion video transport at standard DS-3 digital transmission rate. This bandwidth level allows for integrated video, data and voice transmissions, as well as other multimedia applications. DS-3 communication protocols are used for video transmission at 45 Mbt, this allows a video signal compression ratio of 4:1. This low compression ratio provides a high quality video image at a relatively low cost. The network provides fiber optic transport of audio, video and data signal with Synchronous Optical Network (SONET) standardization. The network architecture of the video distance learning system can also be migrated to Asynchronous Transport Mode (ATM) or other advanced network technologies. According to the preferred embodiment, the network provides for fully interactive, bidirectional video and audio communication between four distance learning classrooms. The network is also configured to support a "broadcast" mode wherein audio and video signals are transmitted from one distance learning classroom to any number of remote sites on the network.

Figure 7:
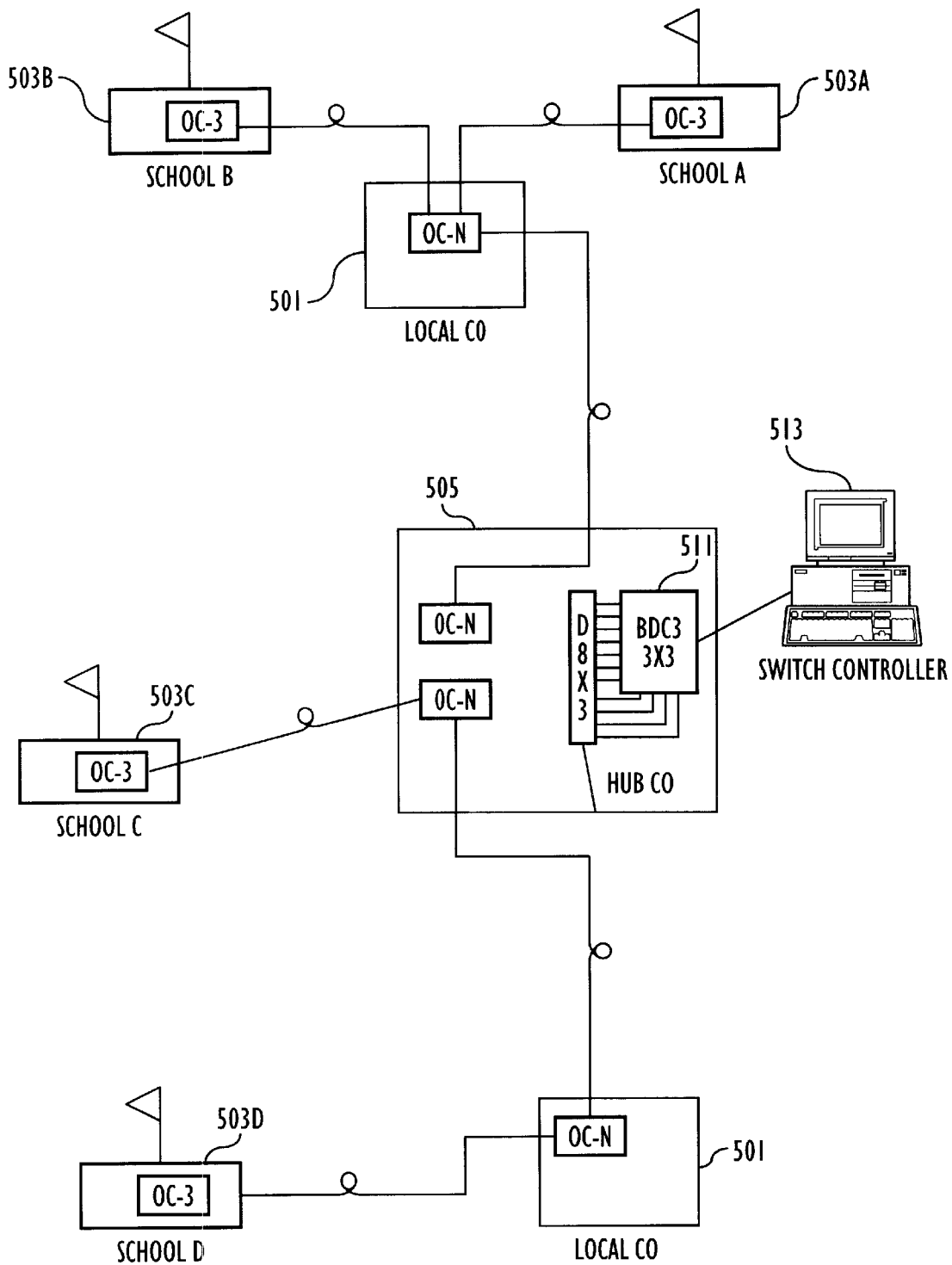
FIG. 7 shows a block diagram of an embodiment of the video distance learning network architecture.
Figure 8:
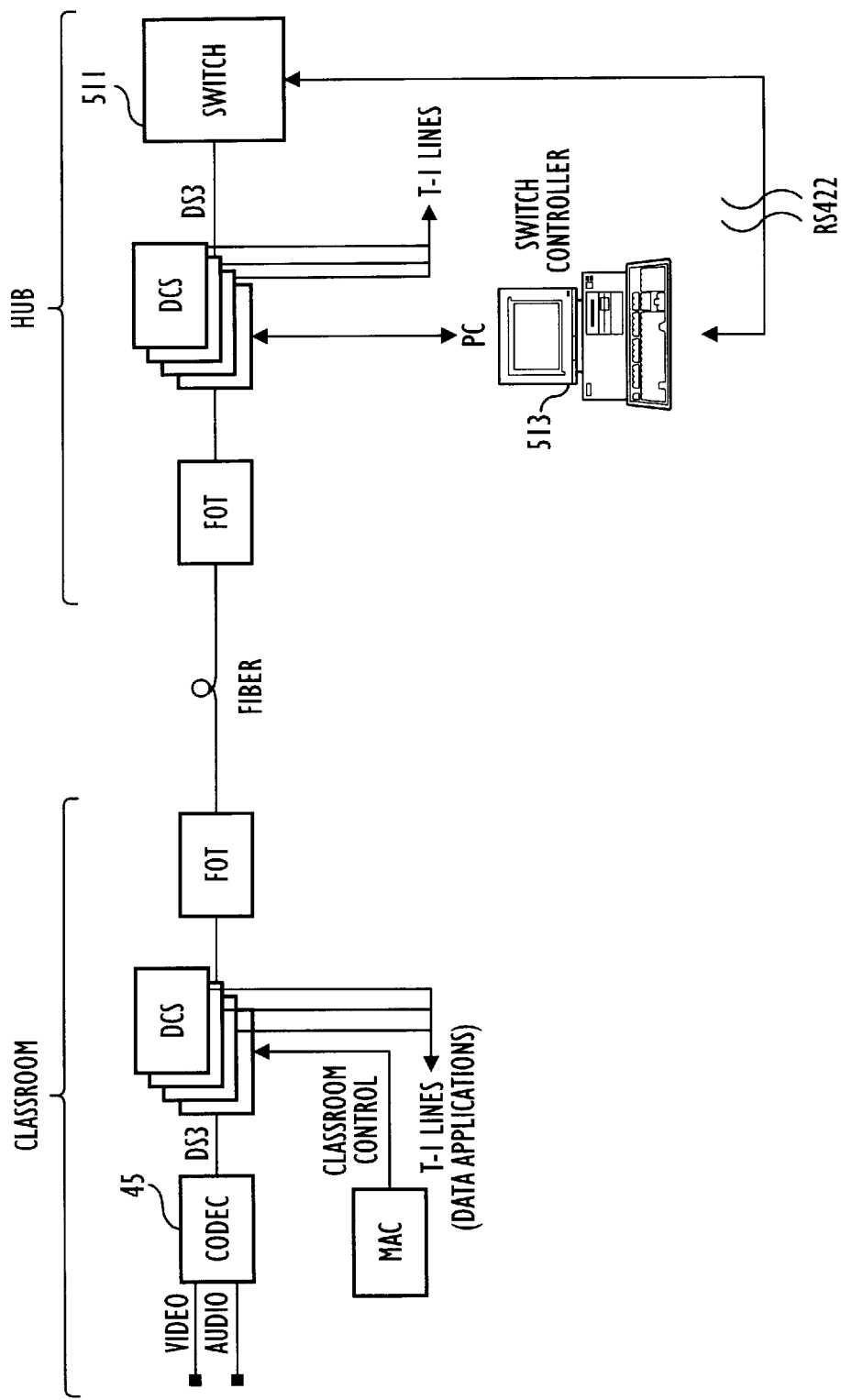
FIG. 8 shows a typical network connection between a classroom and a hub of the video distance learning network.

As shown in FIG. 7, network access within a local region is available through a local central office 501. The local central office 501 is connected to one or more classrooms, such as School A 503A and School B 503B, by fiber optic cables. Each classroom is equipped with OC-3, which is comprised of three DS-3s. The local central office is equipped with OC-N, wherein N corresponds to the number of remote classrooms served by the local central office times three. For example, where local office 501 serves two Schools A, and B each equipped with OC-3, the local central office is equipped with OC-6. A hub central office 505 is provided for connecting a number of local central offices, and controlling the transmission of audio and video signals. Each hub central office 505 is equipped with OC-N, a switch 511 for controlling the transmission of audio and video signals, and a switch controller 513, such as a personal computer, for scheduling classes and activating the switch 511 according to the input schedule. Audio and video signals are transmitted to and from the hub central office over fiber optic cables, while data applications are transmitted over T-1 lines.

Figure 9:
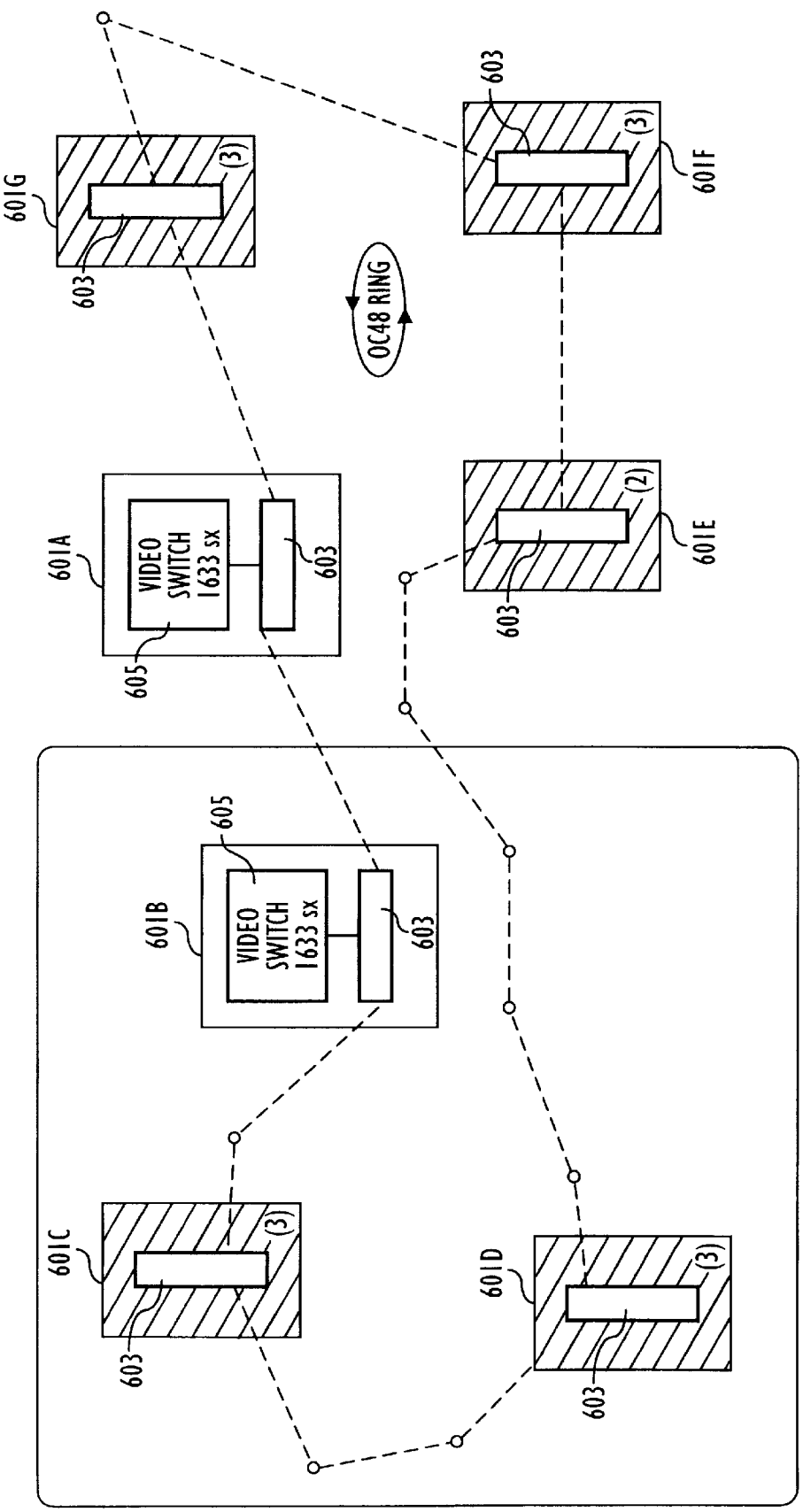
FIG. 9 shows a block diagram of a video access ring of the network for video distance learning.
Figure 10:
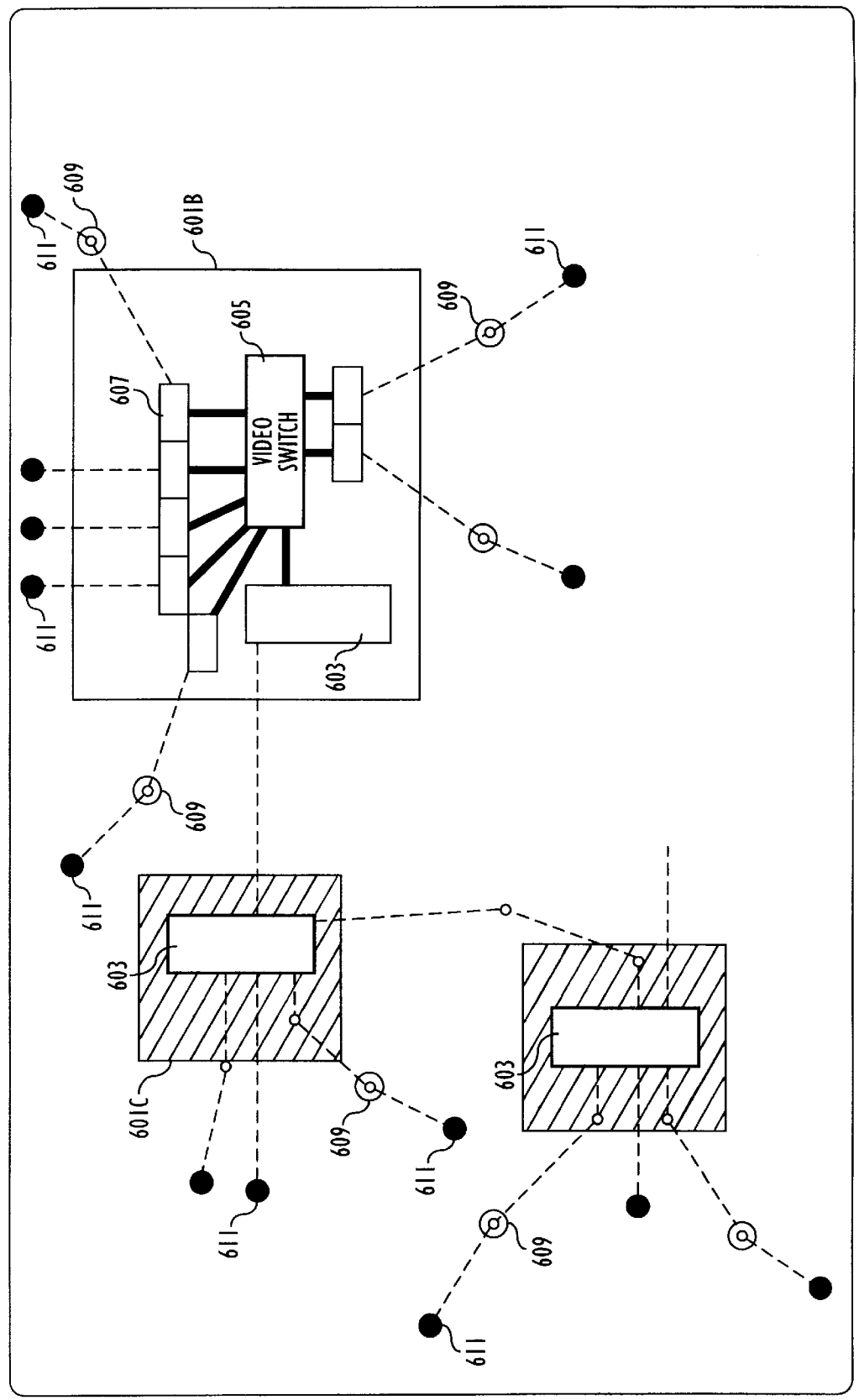
FIG. 10 shows a detailed block diagram of a portion of the video access ring shown in FIG. 9.

The network may also be configured as a video access ring, as shown in FIGS. 9 and 10. The video access ring comprises a number of video access ring hubs 601A–601G arranged in an OC48 ring. Some of the video access ring hubs, such as 601A and 601B, also serve as video hubs central offices as described above. Each video access ring hub includes one OC48 IOF Ring Terminal 603. Each of the video access ring hubs 601A and 601B which also serves as a video hub further includes a 1633sx video switch 605. As best seen in FIG. 9, the video access ring hubs are connected in an OC48 ring by fiber optic cables. As shown in FIG. 10, each video access ring hub is linked to one or more classrooms 611, either directly or through a central office 609. The video switch 605 is connected to a plurality of OC-3s 607, each OC-3 connected to a single classroom 611 or central office 609.

Although the present invention has been described in considerable detail with reference to certain preferred embodiments thereof, other embodiment or configurations are possible. Accordingly, the spirit and scope of the appended claims should not be limited to the description of the preferred embodiments contained herein.

We claim:

1. A video distance learning classroom, comprising:
    a first audio/video station located proximal to a rear of the classroom and comprising at least:
    a rear video camera;
    a primary video monitor connected to display a video image received by said rear video camera; and
    a plurality of secondary video monitors each connected to display images received through a communications port;
    a second audio/video station located proximal to a front of the classroom and comprising at least:
    one or more video cameras connected to said communications port;
    a primary video monitor connected to display a video image received by said rear video camera; and
    a plurality of secondary video monitors each connected to display images received through said communications port.

2. The video distance learning classroom according to claim 1, wherein said plurality of secondary video monitors of said first audio/video station comprise three secondary video monitors, each connected to display images, received through said communications port, of three remote classrooms.

3. The video distance learning classroom according to claim 1, wherein said plurality of secondary video monitors of said second audio/video station comprise three secondary video monitors, each connected to display images, received through said communications port, of three remote classrooms.

4. The video distance learning classroom according to claim 1, further comprising a rear video camera controller connected to said rear video camera.

5. The video distance learning classroom according to claim 1, further comprising a controller connected to each of said one or more video cameras.

6. The video distance learning classroom according to claim 1, further comprising a document table located near the front of the classroom and a document camera positioned to image said document table.

7. The video distance learning classroom according to claim 6, wherein said document camera is fixedly mounted to a side of the second audio/video station.

8. The video distance learning classroom according to claim 6, further comprising a preview monitor connected to said document camera, displaying a graphical video image received by said document camera.

9. The video distance learning classroom according to claim 8, wherein said preview monitor is located in a side of said second audio/video station.

10. The video distance learning classroom according to claim 1, further comprising a plurality of microphones.

11. The video distance learning classroom according to claim 10, further comprising one or more microphone mixers connected to outputs of said microphones.

12. The video distance learning classroom according to claim 11, further comprising one or more line mixers connected to said one or more microphone mixers and communication port audio signals.

13. The video distance learning classroom according to claim 12, further comprising one or more audio amplifiers and loudspeakers positioned within said second audio/video station and connected to one of said one or more line mixers.

14. The video distance learning classroom according to claim 1, further comprising one or more auxiliary video transmitting devices connected to an auxiliary input in said second audio/video station.

15. The video distance learning classroom according to claim 14, further comprising one or more video switchers having inputs connected to said rear video camera, said one or more video cameras and said auxiliary input, and having a first output connected to a video distribution amplifier and a plurality of secondary outputs connected to said plurality of secondary video monitors of said second audio/video station.

16. The video distance learning classroom according to claim 15, wherein said each of said plurality of video monitors of said second audio/video station is connected to an input on a corresponding one of said plurality of video monitors of said first audio/video station.

17. The video distance learning classroom according to claim 1, further comprising a teacher workstation, said teacher workstation including an audio and video output control panel.

18. The video distance learning classroom according to claim 17, wherein said control panel further comprises a touch screen liquid crystal display panel.

19. The video distance learning classroom according to claim 17, wherein said teacher workstation further comprises a personal computer interfaced through said communications port with a network scheduler.

20. A video distance learning system, comprising:
a teaching classroom comprising:
a rear cabinet comprising:
a rear video camera receiving a first video image;
a plurality of rear video monitors;
a front cabinet comprising:
one or more video cameras receiving a second video image for output onto a communication network;
a plurality of front video monitors;
a plurality of remote student classrooms, each student classroom comprising:
a front cabinet comprising:
one or more video cameras receiving a second video image for output onto the network;
a plurality of front video monitors; and
wherein said communications network provides a video and audio link between said teaching classroom and said plurality of student classrooms.

21. The video distance learning system according to claim 20, wherein said plurality of rear video monitors comprise:
a primary video monitor displaying said first video image; and
a plurality of secondary video monitors displaying a corresponding plurality of video images received from the network.

22. The video distance learning system according to claim 20, wherein said plurality of front video monitors comprises:
a primary video monitor displaying said first video image; and
a plurality of secondary video monitors displaying a corresponding plurality of video images received from the network.

23. The video distance learning system according to claim 20, wherein said plurality of remote student classrooms comprises three remote student classrooms.

24. A video distance learning workstation for connecting to a communications network, comprising:
a first video camera receiving a first video image;
a second video camera receiving a second video image;
a primary video monitor, selectively displaying one of said first video image or said second video image;
a plurality of secondary video monitors displaying a corresponding plurality of video images received from the network wherein said plurality of secondary video monitors comprise three front secondary video monitors and three rear secondary video monitors, and said corresponding plurality of video images comprises three video images corresponding to video images from three remote classrooms;
a third video camera receiving a third video image for output to the network.

25. The video distance learning workstation according to claim 24, further comprising a coder/decoder device transmitting audio/video signals to the communication network and receiving audio/video signals from the network.

26. The video distance learning workstation according to claim 24, further comprising a controller connected to said first and third video cameras.

27. The video distance learning workstation according to claim 24, further comprising a controller connected to said second video camera.

28. The video distance learning workstation according to claim 24, further comprising a preview monitor connected to said second video camera displaying said second video image.

29. The video distance learning workstation according to claim 24, further comprising a plurality of microphones.

30. The video distance learning workstation according to claim 29, further comprising one or more microphone mixers connected to said microphones.

31. The video distance learning workstation according to claim 30, further comprising one or more line mixers connected to said microphone mixers and network audio signal inputs.

32. The video distance learning workstation according to claim 31, further comprising one or more loudspeakers connected to said one or more line mixers.

33. The video distance learning workstation according to claim 24, further comprising one or more auxiliary video transmitting devices connected to an auxiliary input.

34. The video distance learning workstation according to claim 33, further comprising one or more video switchers having inputs connected to said first, second and third video cameras and said auxiliary input, and having a first output connected to a video distribution amplifier and a plurality of secondary outputs connected to said plurality of secondary video monitors.

35. The video distance learning workstation according to claim 24, further comprising an audio and video output controller.

36. The video distance learning workstation according to claim 35, wherein said controller further comprises a touch screen liquid crystal display panel.

37. The video distance learning workstation according to claim 24, further including a scheduling computer interfacing with the network.

38. A video distance instruction method comprising the steps of:
shooting video images in each of a plurality of classrooms wherein at least one of said video images is an instructional video image;
displaying a plurality of said video images including at least said instructional video image in the front of each of said classrooms;
receiving audio signals in each of said classrooms;
transmitting audio signal to each of said classrooms;
combining said audio signals in at least one of said classrooms;
playing said combined audio signals in said at least one classroom;
displaying a plurality of said video images in the rear of a classroom originating an instructional video image.

39. A video distance learning classroom, comprising:
a first station located proximal to a rear of the classroom and comprising at least:
a rear video camera;
a primary video monitor connected to display a video image received by said rear video camera; and
a secondary video monitor connected to display an image received through a communications port;
a second station located proximal to a front of the classroom and comprising at least:
one video camera connected to said communications port;
a primary video monitor connected to display a video image received by said rear video camera; and
a secondary video monitor connected to display an image received through said communications port.

40. A video distance learning system, comprising:
a teaching classroom comprising:
    a rear video camera receiving a first video image;
    a plurality of rear video monitors;
    one or more video cameras located proximal to the front of said teaching classroom receiving a second video image for output onto a network;
    a plurality of front video monitors;
    at least one remote student classroom comprising at least:
        a video camera located proximal to the front of said remote student classroom, receiving a second video image for output onto the network;
        a plurality of front video monitors;
        wherein said network provides a video and audio link between said teaching classroom and said student classroom.

41. A video distance learning workstation for connecting to a communications network, comprising:
a first video camera receiving a first video image;
a second video camera receiving a second video image;
a primary video monitor, selectively displaying one of said first video image or said second video image;
a plurality of secondary video monitors displaying a corresponding plurality of video images received from the network;
a third video camera receiving a third video image for output to the network;
at least one auxiliary video transmitting devices connected to an auxiliary input;
at least one video switchers having inputs connected to said first, second and third video cameras and said auxiliary input, and having a first output connected to a video distribution amplifier and a plurality of secondary outputs connected to said plurality of secondary video monitors.

42. The video distance learning workstation according to claim 41, further comprising a coder/decoder device transmitting audio/video signals to the communication network and receiving audio/video signals from the network.

43. The video distance learning workstation according to claim 41, further including a scheduling computer interfacing with the network.

* * * * *